3,326,269
METHOD OF PRODUCING A CASTING MOLD
Hans Schneider, Winterthur, Switzerland, assignor to Sulzer Brothers Limited, Winterthur, Switzerland, a Swiss company
No Drawing. Filed Nov. 10, 1964, Ser. No. 410,271
Claims priority, application Switzerland, Nov. 15, 1963, 13,999/63
6 Claims. (Cl. 164—43)

This invention relates to a method of producing a casting mold slow to react metallurgically, more particularly a mold suitable for the invensment casting of steels or alloys having relatively high contents of chromium, titanium and/or aluminum. In investment casting, a pattern of the required casting is covered with a molding material comprising a binder and refractory fine-grain material and the pattern is removed from the resultant mold by being melted out and/or fired or dissolved out. The molds used are mainly fired, while the binder used in the molding material for making the mold usually contains silica. For example, it is known to produce a colloidal silica solution, or a silica hydrogel, by hydrolysis of a silica ester, for example, ethyl silicate, and to mix this solution as a binder with the fine-grain refractory molding material.

Where such binders are used which contain silica, it has been found to be a disadvantage that the silica contained in the final mold may enter into undesirable reactions when certain metals or alloys are cast, particularly at elevated casting temperatures. When 13% chromium steel is cast, the resultant castings frequently have an undesirable pock-marked surface, for example. Similar casting faults are found with steels or alloys having relatively high contents of titanium and/or aluminum.

It has been found that such undesirable phenomena are due to a reaction of the silica with the particular alloy component in the presence of atmospheric oxygen. This reaction results in alloying constituents forming a slag and the effect of this in the cooled casting is the said usually pock-marked surface faults.

The invention is based on the finding that the silica which is contained in the molding material or binder must be fixed so as to be stable. The invention is characterized in that the molding material used contains a binder in the form of a mixture of the colloidal solution of the hydroxide of at least one of the elements: aluminum, magnesium, and zirconium, and a colloidal solution of silica, and that the resultant green mold is fired.

The effect of the invention is that the mixture of the hydroxide and silica present as a colloidal solution in the green mold is subsequently converted on firing of the mold into a stable compound in the form of silicates known per se in which the silica is fixed so as to be stable and, in particular, no longer reacts with the reactive alloying components. The result is castings which have a perfect surface irrespective of the composition of the melt.

It is advantageous to use a binder mixture which contains silica in a quality of from 3 to 8 times, by weight, that of the hydroxide. The green mold is advantageously dried before firing and then is fired at temperatures in the range of between 800 and 1200° C. Higher or lower temperatures may be used. Time and temperature conditions should be such that the silica is sufficiently stabilized to accomplish the purposes of this invention. For the reaction occurring between the hydroxide and the silica on firing, it is advantageous to add a catalyst to the molding material, for example, tungsten oxide, or a cobalt oxide such as $Co_2O_3$. Such a catalyst enables the firing temperature to be reduced. Any suitable catalyst for promoting the reaction between the metallic hydroxide and the silica can be used as readily understood by those skilled in the art. The binder mixture also advantageously contains an alcohol as diluent. Methyl, ethyl, propyl, isopropyl alcohols, and the like, can be used. The colloidal solution of the binder mixture is then advantageously obtained by hydrolysis of a silica ester in an aqueous gel of the hydroxide with the addition of the alcohol diluent and, if required, a hydrolysis-accelerating catalyst.

The invention and other features and advantages thereof are explained in detail hereinbelow with reference to examples.

*Example 1*

750 grams of precipitated aluminum hydroxide are dissolved in 2250 ml. of $H_2O$. A gel is formed from the resultant solution. It is then mixed with 12 litres of isopropanol (concentrated) and thoroughly mixed and stirred to form a syrup-like solution. 12 litres of ortho-ethyl silicate and 50 ml. of hydrochloric acid (concentrated) are added to this solution and intensively stirred for 15 hours. The ethyl silicate hydrolyzes during this period and colloidal silica forms in a very fine distribution in the existing aluminum hydroxide gel.

To form the molding material, the resultant binder solution is mixed with 70 kg. of fine-grain corundum and 500 grams of cobalt oxide ($Co_2O_3$). The cobalt oxide serves as a catalyst for the reaction occurring between the aluminum hydroxide and the silica in the binder when the mold is fired.

To prepare the casting mold, a pattern corresponding to the required casting, and made from a destructible material, for example, urea, is dipped into the resultant molding material. The thin coating adhering to the surface of the pattern is sprinkled with a relatively coarse refractory material and left to dry for about two hours. This dipping and sprinkling followed by drying is repeated some seven to ten times.

The resultant shell-like body is then placed in a water bath in order to dissolve out the urea pattern and is then dried conventionally. By means of the solvent passing through the mold pores, the pattern can be completely or else just partially dissolved out so that the remaining pattern residue is destroyed on the subsequent firing of the mold. Firing is carried out at a maximum temperature of about 1000° C. and takes about two hours. The completed mold is distinguished by excellent surface quality of the casting cavity and very good strength properties. On firing, the colloidal mixture of aluminum hydroxide and silica is converted to sillimanite ($Al_2O_3SiO_2$) in which the silica is fixed so as to be stable.

Immediately after removal from the firing oven a steel containing 13% of chromium, 0.5% of silicon, 0.8% of manganese, 0.15% of carbon, and remainder iron, is poured into the mold; the pouring temperature is about 1630° C. The resultant casting is distinguished by a flawless surface; in particular, there are no small surface faults which occur where silica-containing binders have been used heretofore as a result of slagging of alloying constituents in the presence of silica and atmospheric oxygen.

Molds obtained in the same way were also used for the production of castings from an alloy containing 0.12% of carbon, 20% of chromium, 0.34% of titanium, 0.16% aluminum, remainder nickel. The castings had a perfect surface. The latter material is poured preferably in a vacuum furnace.

In some cases the pattern can be dipped just two to three times in the molding material obtained as described above and then be conventionally backed with a suitable second molding material in a flask, for example, a cement-bonded molding material.

Example II 500 grams of the composition AlO(OH) (Böhmit) were made into a gel with 2500 ml. of H₂O to form a colloidal aluminum hydroxide solution. As in Example I, 12 litres of isopropanol and also 12 litres of ortho-ethyl silicate and 50 ml. of hydrochloric acid were added, and the ethyl silicate was hydrolyzed overnight in the mixture. 75 kg. of mullite were added to this binder solution and molds made from the molding material were fired for six hours at 1300° C. without a catalyst. Castings made by means of the mold from the steels or alloys mentioned under Example I are distinguished by excellent surface quality and good strength.

Example III 9 litres of condensed ethyl silicate were mixed with 1¾ litres of water, 50 ml. of hydrochloric acid (concentrated) and 10 litres of ethyl alcohol and the mixture was left to stand for about 15 hours so that the ethyl silicate completely hydrolyzed to silica. The latter is present in colloidal solution to which 750 grams of precipitated aluminum hydroxide dissolved in 2250 ml. of H₂O were then added. The resultant mixture was thoroughly stirred and a colloidal solution forms of a mixture of aluminum hydroxide and silica. This colloidal solution is used as a binder for making molds as in Example I. Castings made with such molds from steels or alloys containing constituents readily reacting with free silica have a smooth surface quite free of pock-marks and slagging.

The invention is not limited to the exemplified embodiments described. More particularly, molds made according to the invention have a much greater strength than molds containing non-fixed silica as binder while the invention also gives advantages in cases in which there is no harmful reaction between mold constituents and the metal for casting.

Moreover, the aluminum hydrovide can readily be replaced by the hydroxide of zirconium or magnesium. These hydroxides are also adapted to fix the silica on firing to form zirconium silicate or magnesium silicate, respectively. The same quantities of zirconium or magnesium hydroxide may be used as indicated for aluminum hydroxide.

Propyl silicate or methyl silicate may be used instead of ethyl silicate, and vice versa. In addition, a mold according to the invention may contain substances other than corundum or mullite as a finely divided refractory constituent, for example, zirconium silicate, fire clays, zirconium powder, magnesia, or mixtures of two or more of the said refractory substances. The method according to the invention may also be used in conjunction with pattern materials other than urea or mixtures of urea with plasticizers, such as polyvinyl alcohol, for example, in conjunction with patterns of wax, thermoplastics, or even permanent patterns of wood, metal, or the like, not intended to be destroyed in the mold.

The amount of colloidal silica which may be used according to this invention is advantageously about 3–8 times by weight the amount of metallic hydroxide present. This proportion may be either larger or small as desired.

I claim:

1. A process for preparing a casting mold which comprises forming a molding mixture containing a finely divided refractory material and a binder, said binder comprising a colloidal solution of silica and a metallic hydroxide selected from the group consisting of hydroxides of aluminum, magnesium, and zirconium, said binder comprising 3 to 8 parts by weight of silica for each part by weight of the metallic hydroxide, contacting the molding mixture with a suitable pattern to form a green mold and heating said green mold to a temperature in the range from about 800° C. to about 1200° C. to react the metallic hydroxide with the colloidal silica to form a stable metallic silicate and thereby forming a casting mold.

2. A process according to claim 1 wherein said silica and metallic hydroxide are in an aqueous alcoholic medium in which there is dissolved an acid.

3. A process according to claim 2 wherein said binder contains a catalyst for promoting a reaction between the metallic hydroxide and the silica.

4. A process according to claim 1 wherein said binder is in an aqueous alcoholic medium containing a catalyst selected from the group consisting of cobalt oxide and tungsten oxide.

5. A process according to claim 4 wherein said binder is a mixture of an aluminum hydroxide gel and a hydrolyzed silicate ester in an aqueous alcoholic medium containing an acid and a catalytic amount of cobalt oxide.

6. A process according to claim 5 wherein said silicate ester is ethyl silicate, said aqueous alcoholic medium is aqueous propanol, and said acid is hydrochloric acid.

References Cited

UNITED STATES PATENTS

| | | | |
|---|---|---|---|
| 1,945,534 | 2/1934 | Rembert | 23—110 |
| 2,380,945 | 7/1945 | Collins. | |
| 2,701,902 | 2/1955 | Strachan | 106—38.35 X |
| 2,818,619 | 1/1958 | Bradley et al. | 106—38.35 X |
| 3,148,422 | 9/1964 | Payne | 22—196 |
| 3,180,747 | 4/1965 | Patton | 23—110 X |
| 3,206,810 | 9/1965 | Hockin et al. | 22—196 X |
| 3,207,612 | 9/1965 | Martin | 106—69 |

J. SPENCER OVERHOLSER, *Primary Examiner.*

E. MAR, *Assistant Examiner.*